United States Patent
Long et al.

(10) Patent No.: US 12,023,616 B1
(45) Date of Patent: Jul. 2, 2024

(54) METHOD FOR PREPARING UNBREAKABLE MICRO-ELECTROSTATIC FILTER

(71) Applicant: AirQuality Technology (Shanghai) Co., Ltd., Shanghai (CN)

(72) Inventors: Shidan Long, Shanghai (CN); Shanqing Meng, Shanghai (CN); Qin Li, Shanghai (CN)

( * ) Notice: Subject to any disclaimer, the term of this patent is extended or adjusted under 35 U.S.C. 154(b) by 0 days.

(21) Appl. No.: 18/587,713

(22) Filed: Feb. 26, 2024

Related U.S. Application Data (63) Continuation of application No. PCT/CN2022/142364, filed on Dec. 27, 2022.

(30) Foreign Application Priority Data

Oct. 14, 2022  (CN) .......................... 202211261691.1

(51) Int. Cl.
    B01D 46/00    (2022.01)
(52) U.S. Cl.
    CPC ..... B01D 46/0001 (2013.01); B01D 46/0032 (2013.01)
(58) Field of Classification Search
    None
    See application file for complete search history.

(56) References Cited

U.S. PATENT DOCUMENTS 5,330,559 A    7/1994  Cheney et al.

FOREIGN PATENT DOCUMENTS

| CN | 104437862 | A |   | 3/2015  |          |
|----|-----------|---|---|---------|----------|
| CN | 104492600 | A |   | 4/2015  |          |
| CN | 206104126 | U |   | 4/2017  |          |
| CN | 107042159 | A |   | 8/2017  |          |
| CN | 108654840 | A |   | 10/2018 |          |
| CN | 110404681 | A |   | 11/2019 |          |
| CN | 115519804 | A | * | 12/2022 | ........... B29C 69/001 |
| CN | 115581791 | A | * | 1/2023  | ............... A61L 2/02 |
| JP | H1190265  | A |   | 4/1999  |          |
| JP | 2008012526| A |   | 1/2008  |          |

OTHER PUBLICATIONS

Internation Search Report of PCT/CN2022/142364, Mailed Jun. 28, 2023.

* cited by examiner

*Primary Examiner* — Brit E. Anbacht (57) ABSTRACT

Disclosed is a method for preparing an unbreakable micro-electrostatic filter, which comprises: using raw materials obtained by the secondary granulation, cutting after extrusion moulding to obtain an electrode material isolating and carrying frame, arranging an interval-retaining spacer between the upper panel and the lower panel of the electrode material isolating and carrying frame, arranging a strip-shaped conductive material with a preset size on a surface of the electrode material isolating and carrying frame at regular interval in a direction perpendicular to the quadrilateral air channel to obtain a basic filtering plate, then stacking basic filtering plates to form a filter mold base, hot-melt cutting a micro-electrostatic filter with a required size out of the filter mold base through relative movement of the filter mold base and the heating wire, wherein each edge of the micro-electrostatic filter is subjected to hot-melt cutting, to form a micro-electrostatic filter with completely sealed electrodes.

4 Claims, 6 Drawing Sheets

```
┌─────────────────────────────────────────────────────────────┐
│  drying granular insulating dielectric raw materials with   │── S1
│  a box dryer, and evenly mixing the dried granular          │
│  insulating dielectric raw materials with a flame           │
│  retardant and a color master batch to carry out            │
│  secondary granulation                                      │
└─────────────────────────────────────────────────────────────┘
                              ▼
┌─────────────────────────────────────────────────────────────┐
│  using raw materials obtained by the secondary              │── S2
│  granulation, and after extrusion moulding, cutting to      │
│  obtain an electrode material isolating and carrying        │
│  frame, which comprises an upper panel and a lower panel,   │
│  wherein an interval-retaining spacer is arranged between   │
│  the upper panel and the lower panel, and the interval-     │
│  retaining spacer, together with the upper panel and the    │
│  lower panel, forms an air channel                          │
└─────────────────────────────────────────────────────────────┘
                              ▼
┌─────────────────────────────────────────────────────────────┐
│  arranging a strip-shaped conductive material with a        │── S3
│  preset size on a surface of the electrode material         │
│  isolating and carrying frame at regular interval, so as    │
│  to obtain a basic filtering plate, wherein the strip-      │
│  shaped conductive material on the basic filtering plate    │
│  has two ends that are recessed at preset distances         │
│  respectively, and a recess distance at one end is          │
│  greater than that at the other end                         │
└─────────────────────────────────────────────────────────────┘
                              ▼
┌─────────────────────────────────────────────────────────────┐
│  stacking basic filtering plates, horizontally rotating     │── S4
│  one of two adjacent basic filtering plates by 180°         │
│  relative to the other when stacking, and after the         │
│  stacking is completed, covering the strip-shaped           │
│  conductive material exposed on one side with at least      │
│  one layer of electrode material isolating and carrying     │
│  frame that is not provided with an electrode material,     │
│  so as to form a filter mold base                           │── S5
└─────────────────────────────────────────────────────────────┘
                              ▼
┌─────────────────────────────────────────────────────────────┐
│  heating a heating wire to a preset temperature, and        │
│  hot-melt cutting a micro-electrostatic filter with a       │
│  required size out of the filter mold base through          │
│  relative movement of the filter mold base and the          │
│  heating wire according to intervals of the strip-shaped    │
│  conductive material, wherein each edge of the micro-       │
│  electrostatic filter is subjected to hot-melt cutting,     │
│  so as to form a micro-electrostatic filter with            │── S6
│  completely sealed electrodes                               │
└─────────────────────────────────────────────────────────────┘
                              ▼
┌─────────────────────────────────────────────────────────────┐
│  cutting electrode strip accommodating grooves,             │
│  perpendicular to the strip-shaped conductive material,     │
│  at two ends of the micro-electrostatic filter              │
│  respectively in a length direction of the strip-shaped     │
│  conductive material                                        │
└─────────────────────────────────────────────────────────────┘
```

METHOD FOR PREPARING UNBREAKABLE MICRO-ELECTROSTATIC FILTER

CROSS-REFERENCE TO RELATED APPLICATIONS

The present application claims priority benefits of Chinese Patent Application No. 202211261691.1, filed on Oct. 14, 2022, and International Paten Application No. PCT/CN2022/142364, filed on Dec. 27, 2022, and the entire contents of which are hereby incorporated by reference.

TECHNICAL FIELD

The present application belongs to the technical field of air purification, and in particular relates to a method for preparing an unbreakable micro-electrostatic filter.

BACKGROUND ART

Micro-electrostatic precipitator refers to the technology featured with carrying out air purification by using a strong electric field where a dielectric material acts as a carrier. The dielectric material wraps around electrode slices to form cellular hollow microporous channels. Formed inside the channels, a strong electric field exerts a tremendous attraction on charged particles in the air, while such microorganisms attached to the particles as bacteria and viruses can be collected and killed in the strong electric field. The micro-electrostatic precipitator can not only efficiently remove PM1.0, PM2.5, and PM10, but effectively remove microorganisms, such as *Staphylococcus albus*, natural bacteria, H1N1 influenza A virus, and SARS-COV-2 novel coronavirus, thereby achieving high-efficiency and broad-spectrum sterilization and disinfection; moreover, since it has the characteristics of low resistance, no consumables, safety, harmlessness, man-machine symbiosis, and resultants without harmful substances (such as ozone), the micro-electrostatic precipitator has been widely used in purification and disinfection products for human settlements.

The micro-electrostatic precipitator consists of an ionization region (an ionizing module) and a dust collection region (a micro-electrostatic filter), both of which are powered by high-voltage power sources. The power sources not only can be built into the ionizing module and the micro-electrostatic filter, but can be placed outside the ionizing module and the micro-electrostatic filter, and are connected via wires. According to two different typical forms of ionizing modules, the micro-electrostatic precipitator can be divided into charged micro-electrostatic precipitator, in which an ion generator releases charges, and field micro-electrostatic precipitator, which consists of field-electric modules composed of metal polar plates with needle tips. The former is suitable for small spaces that are subjected to indoor circulation, while the latter is suitable for places, into which outdoor fresh air is introduced, or large and medium-sized spaces that are relatively complex in air distribution.

In high-humidity environments, such as an environment with a relative humidity of >80%, a micro-electrostatic air purifier often fails to work stably and continuously, and shows a rapid decline in the efficiency and dust-holding capacity as humidity rises. Moreover, in the case of high humidity, once the dielectric material of the micro-electrostatic filter in the purifier is damaged, the micro-electrostatic filter is extremely prone to current leakage, arcing, and sparking, which cause the purifier to work abnormally; meanwhile, voltage and current control failure even results in temperature rise of the dielectric material at leakage points of the micro-electrostatic filter, melting through the same, and eventually burning out the same in a large area. Due to the insoluble problems, micro-electrostatic air purifiers on the market suffer from degradation in the efficiency and dust-holding capacity in high-humidity environments, thereby causing fire accidents from time to time.

There often exist some deficiencies in the currently existing processing technology of micro-electrostatic filters on the market: (1) dielectric layers of the filter are not effectively pressed together, and gaps between the layers are apt to expose the electrode material, which leads to current leakage, arcing, and sparking during the actual operation of purification; (2) the dielectric of the micro-electrostatic filter is pasted with glue, which gives rise to poor internal seal and exposure of electrodes under external influences such as heat, and ends with current leakage, arcing, and sparking during operation; (3) electrodes are exposed, which causes current leakage, arcing, and sparking in actual use.

Therefore, it is particularly important how to produce a micro-electrostatic filter in such a better way as to ensure that the dielectric material has sealed and unbreakable edges.

CONTENTS OF THE INVENTION

It is an objective of the present application to provide a method for preparing an unbreakable micro-electrostatic filter, which method aims at problems currently existing in the processing technology of micro-electrostatic filters, finds out roots of the problems, solves the problems one by one, and through repeated verification, forms a new technology that enables the production of a micro-electrostatic filter free of damage and current leakage, so as to meet the need of application in high-humidity environments.

To achieve the above objective, the present application adopts a technical solution as follows:

a method for preparing an unbreakable micro-electrostatic filter, comprising:

drying granular insulating dielectric raw materials with a box dryer, and evenly mixing the dried granular insulating dielectric raw materials with a flame retardant and a color master batch to carry out secondary granulation; using raw materials obtained by the secondary granulation, and after extrusion moulding, cutting to obtain an electrode material isolating and carrying frame, which comprises an upper panel and a lower panel, wherein an interval-retaining spacer is arranged between the upper panel and the lower panel, and the interval-retaining spacer, together with the upper panel and the lower panel, forms an air channel; arranging a strip-shaped conductive material with a preset size on a surface of the electrode material isolating and carrying frame at regular interval, so as to obtain a basic filtering plate, wherein the strip-shaped conductive material on the basic filtering plate has two ends that are recessed at preset distances respectively, and a recess distance at one end is greater than that at the other end;

stacking basic filtering plates, horizontally rotating one of two adjacent basic filtering plates by 180° relative to the other when stacking, and after the stacking is completed, covering the strip-shaped conductive material exposed on one side with at least one layer of electrode material isolating and carrying frame that is not provided with an electrode material, so as to form a filter mold base;

heating a heating wire to a preset temperature, and hot-melt cutting a micro-electrostatic filter with a required size out of the filter mold base through relative movement of the filter mold base and the heating wire according to intervals of the strip-shaped conductive material, wherein each edge of the micro-electrostatic filter is subjected to hot-melt cutting, so as to form a micro-electrostatic filter with completely sealed electrodes;

cutting electrode strip accommodating grooves, perpendicular to the strip-shaped conductive material, at two ends of the micro-electrostatic filter respectively in a length direction of the strip-shaped conductive material.

Further, the granular insulating dielectric raw materials are at least one of polyethylene, polypropylene, polyvinyl chloride, polystyrene, acrylonitrile-butadiene-styrene copolymer, polyoxymethylene, polyamide, polycarbonate, polyethylene terephthalate, and polyimide;

the flame retardant is at least one of tris(2,3-dibromopropyl) isocyanurate, tribromophenol, tricresyl phosphate, triphenyl phosphinate, and dimethyl methylphosphonate;

the granular insulating dielectric raw materials have a weight percentage of 89% to 93%, the flame retardant has a weight percentage of 3% to 8%, and the color master batch has a weight percentage of 1% to 3%.

Further, the air channel is a quadrilateral air channel; when the basic filtering plates are stacked, quadrilateral air channels of adjacent basic filtering plates are in such alternate distribution that an interval-retaining spacer of a quadrilateral air channel of one sheet of basic filtering plate is located between two interval-retaining spacers of a quadrilateral air channel of another sheet of basic filtering plate.

Further, the strip-shaped conductive material is compounded by resins, conductive materials, flame retardants, adhesives among others; the strip-shaped conductive material has an internal resistance value within a range from $10^5$ megohms to $10^8$ megohms.

Further, in said heating a heating wire to a preset temperature, the preset temperature is 190° C. to 210° C.

Further, the heating wire has an advance speed of 5 mm/min to 20 mm/min.

Further, said hot-melt cutting a micro-electrostatic filter with a required size comprises:

stacking the basic filtering plates in a U-shaped body of a position-limiting device, placing pressure strips at intervals on a basic filtering plate that is on the top, and then mounting a front baffle plate on the U-shaped body through fasteners, so as to form a position limitation on the filter mold base;

arranging grooves for movement of the heating wire on a front baffle plate and a rear baffle plate of the U-shaped body, and moving the heating wire along center lines of the grooves, so as to finish hot-melt cutting.

Further, the strip-shaped conductive material of the micro-electrostatic filter has a recess distance of 0 to 10 mm on one end and a recess distance of 10 mm to 30 mm on the other end.

Further, the strip-shaped conductive material of the micro-electrostatic filter on left and right sides keeps a distance of 2 mm to 15 mm from edges.

Further, said cutting electrode strip accommodating grooves, perpendicular to the strip-shaped conductive material, at two ends of the micro-electrostatic filter respectively in a length direction of the strip-shaped conductive material comprises:

heating the heating wire to a preset temperature, cutting electrode strip accommodating grooves, perpendicular to the strip-shaped conductive material, at two ends of the micro-electrostatic filter respectively in a length direction of the strip-shaped conductive material through relative movement of the micro-electrostatic filter and the heating wire.

Proposed in the present application, the method for preparing an unbreakable micro-electrostatic filter aims at such problems as unstable operation and low efficiency of the micro-electrostatic air purifier in high-humidity environments that have a relative humidity of >80%, improves the design in terms of the material selection and preparation process of the dielectric material, enhances the sealing performance of the frame and electrodes, and fundamentally prevents the problems of current leakage, arcing, and sparking caused by the damage to the dielectric material and the exposure of the electrodes, so as to ensure that the micro-electrostatic air purifier works stably in the high-humidity environments that have a relative humidity of >80%.

By adopting the technological mode of hot melt with a heating wire and specific technological parameters, the heated dielectric material is deformed, and slightly liquefied and curled to completely envelop the electrode, and avoid problems such as dripping due to excessive liquefaction and gaps caused by poor sealing. Since unstable temperature of the heating wire will lead to problems such as edge deformation and material blackening, the present application prevents the heating wire from direct contact with the dielectric plate by a slow and stable advance speed of the heating wire, thereby avoiding the temperature drop of the heating wire as caused by the phenomenon that fluid hangs on the heating wire, and effectively solving the problem of poor sealing. The finished product of the micro-electrostatic filter as prepared has better working stability in high-humidity environments, ensures working efficiency and dust-holding capacity, and avoids problems such as current leakage, arcing, and sparking.

DESCRIPTION OF FIGURES

FIG. 1 is a flow diagram of a method for preparing an unbreakable micro-electrostatic filter in the present application;

MODE OF CARRYING OUT THE INVENTION

To make the objective, technical solution, and advantages of the present application clearer, the present application is further described in detail as below in combination with the drawings and embodiments. It should be understood that the specific embodiments described herein are only used to explain the present application, rather than limit the present application.

In high-humidity environments or even in the presence of water droplets, when electrodes and circuits of micro-electrostatic filters are not completely sealed or the dielectric material on the surface is damaged, the existing micro-electrostatic air purifiers are extremely prone to short circuit, which leads to current leakage, breakdown, arcing, and sparking, and the dielectric material enveloped nearby are also subjected to breakdown, ignition, and even burnout; moreover, if adsorbed particles adhere thereto, charges are easier to gather on polar plates, the attached particles are also more apt to absorb droplets in the air, and their protrusions are more likely to worsen the current leakage, reduce the efficiency of the filter, further damage the enveloped dielectric material, and affect the normal and safe operation of the filter. Therefore, it is of great significance to prepare a micro-electrostatic filter with well-sealed electrodes and unbreakable dielectric material.

In one embodiment, as shown in FIG. 1, a method for preparing an unbreakable micro-electrostatic filter is provided, comprising:

Step S1, drying granular insulating dielectric raw materials with a box dryer, and evenly mixing the dried granular insulating dielectric raw materials with a flame retardant and a color master batch to carry out secondary granulation.

The micro-electrostatic filter is a device that is made from an insulating dielectric material, and has filtration pores and a built-in electrode material.

The insulating dielectric material in the present embodiment has components that include granular insulating dielectric raw materials, a flame retardant, and a color master batch, and is first subjected to secondary granulation. Before the secondary granulation, the granular insulating dielectric raw materials are first dried. Drying can evaporate water vapor in the dielectric material, and during extrusion molding, avoid generating air bubbles that affect the smoothness of the surface of the electrode material isolating and carrying frame.

The box dryer is applicable to drying all kinds of polymer materials, and can dry different materials simultaneously. It is very suitable for a small amount of diverse raw materials or for mold testing. It can also be used for preheating or drying treatment of same products in multiple industries, such as electronics, motors, electroplating, paint baking, and printing.

Specifically, the granular insulating dielectric raw materials, the flame retardant, and the color master batch in the present embodiment have a weight percentage respectively as follows: 89% to 93% of dried granular insulating dielectric raw materials, 3% to 8% of flame retardant, and 1% to 3% color master batch.

Wherein, the granular insulating dielectric raw materials are at least one of polyethylene, polypropylene, polyvinyl chloride, polystyrene, acrylonitrile-butadiene-styrene copolymer, polyoxymethylene, polyamide, polycarbonate, polyethylene terephthalate, and polyimide. The flame retardant is at least one of tris(2,3-dibromopropyl) isocyanurate, tribromophenol, tricresyl phosphate, triphenyl phosphinate, and dimethyl methylphosphonate. In other words, one of them or a mixture of more than one is used. The color master batch is one corresponding to the selected granular insulating dielectric raw materials.

In a specific embodiment, the raw materials obtained by the secondary granulation have a melt index of 3 g/10 min to 6 g/10 min. If the melt index is overly low, the raw materials will become liquid quickly during hot-melt cutting, and if it is overly high, the internal printed electrodes cannot be completely enveloped with curled edges by hot-melt cutting.

Step S2, using raw materials obtained by the secondary granulation, and after extrusion moulding, cutting to obtain an electrode material isolating and carrying frame, which comprises an upper panel and a lower panel, wherein an interval-retaining spacer is arranged between the upper panel and the lower panel, and the interval-retaining spacer, together with the upper panel and the lower panel, forms an air channel.

Figure 2:
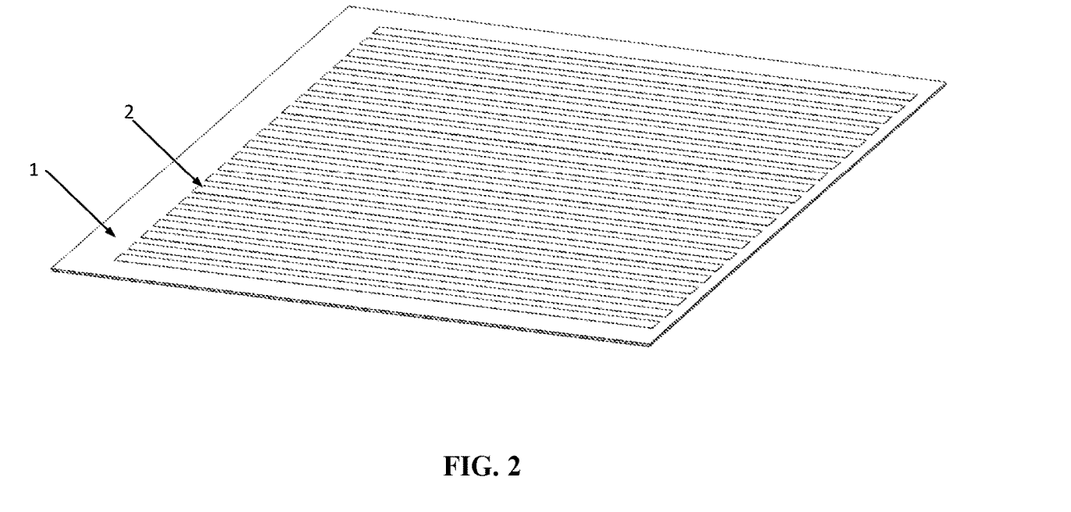
FIG. 2 is a diagram of a basic filtering plate in an embodiment of the present application.
Figure 3:
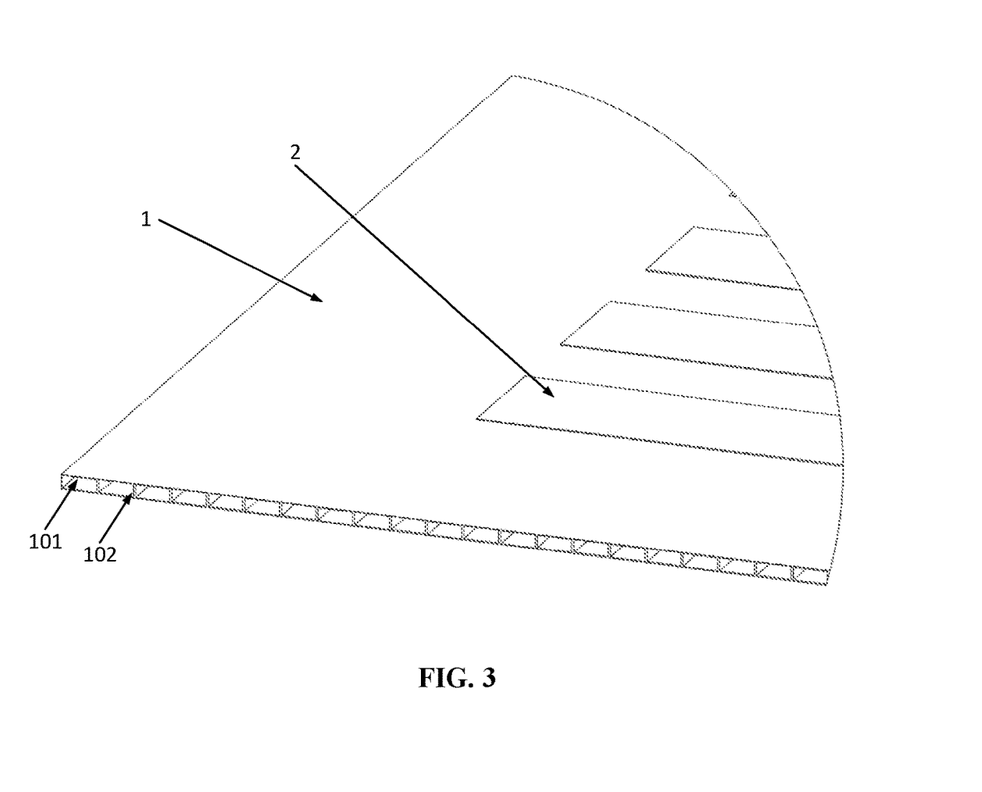
FIG. 3 is a partial enlarged diagram of a basic filtering plate in an embodiment of the present application.

In the present embodiment, the electrode material isolating and carrying frame obtained by cutting after extrusion molding, as shown in FIGS. 2 and 3, is a thin sheet-like plate 1, which comprises an upper panel, a lower panel, and an interval-retaining spacer 102. The interval-retaining spacer 102 isolates to form a row of air channels 101 in the middle of the plate, and these air channels 101 act as air channel filtration pores for collecting dust when the micro-electrostatic air purifier is used. Each electrode material isolating and carrying frame obtained by cutting is equal in length and width.

In a specific embodiment, the electrode material isolating and carrying frame has a thickness of 1.5 mm, and the air channel has a size of 4 mm×1.3 mm.

Step S3, printing the strip-shaped conductive material with a preset size on a surface of the electrode material isolating and carrying frame at regular interval, so as to obtain a basic filtering plate, wherein the strip-shaped conductive material on the basic filtering plate has two ends that are recessed at preset distances respectively, and a recess distance at one end is greater than that at the other end.

In the present embodiment, to improve the production efficiency, multiple micro-electrostatic filters are prepared simultaneously, and then individual micro-electrostatic filters are obtained by cutting. The strip-shaped conductive material is an electrode material coated on the surface of the electrode material isolating and carrying frame, and its size is designed according to the size of the micro-electrostatic filter to be prepared. The strip-shaped conductive material is used to sense an external power source and generate an electrostatic field inside the micro-electrostatic filter.

The strip-shaped conductive material is mainly compounded by such materials as resins, conductive materials, flame retardants, and adhesives; the strip-shaped conductive material has an internal resistance value within a range from 105 megohms to 108 megohms.

The micro-electrostatic filter as finally prepared has electrodes that need to be electrically coupled with positive and negative electrodes of an external power source, respectively. To facilitate constructing the positive and negative electrodes inside the micro-electrostatic filter, in the present embodiment, the strip-shaped conductive material on the filter basic plate has two ends that are recessed at preset distances respectively, and a recess distance at one end is greater than that at the other end. As shown in FIG. 2, the recess distance at the left end of the strip-shaped conductive material is greater than that at the right end. The strip-shaped conductive material is printed on the upper surface of the electrode material isolating and carrying frame at regular interval, and the interval between two strips of strip-shaped conductive material is set according to the distance between edges of individual micro-electrostatic filters, which will not be elaborated herein.

In some embodiments, the electrode material can be arranged on the upper surface, the lower surface, or both of the upper and lower surfaces of the electrode material isolating and carrying frame. When the electrode material is placed on the upper and lower surfaces simultaneously, it is necessary to ensure that the electrode material has two ends that are recessed on the upper and lower surfaces in just opposite depths, i.e., the recess depth on the left end portion of the upper surface is the same as that on the right end portion of the lower surface, and the recess depth on the right end portion of the upper surface is the same as that on the left end portion of the lower surface.

In the other embodiments of the present application, the electrode material is only arranged on the upper surface or the lower surface of the electrode material isolating and carrying frame.

In a specific embodiment, the strip-shaped conductive material has a recess distance of 0 to 10 mm at one end, and a recess distance of 10 mm to 30 mm at the other end. The strip-shaped conductive material on left and right sides keeps a distance of 2 mm to 15 mm from edges. The strip-shaped conductive material has a width of 12 mm to 18 mm, and an interval of 24 mm to 28 mm.

Step S4: stacking basic filtering plates, horizontally rotating one of two adjacent basic filtering plates by 180° relative to the other when stacking, and after the stacking is completed, covering the strip-shaped conductive material exposed on one side with at least one layer of electrode material isolating and carrying frame that is not provided with an electrode material, so as to form a filter mold base.

In the present embodiment, the single-layer filtering basic plates are stacked, and the number of stacked layers is determined according to the thickness of the micro-electrostatic filter that needs to be prepared in the end, and the required thickness can be achieved by appropriately increasing or decreasing the number of layers.

Figure 4:
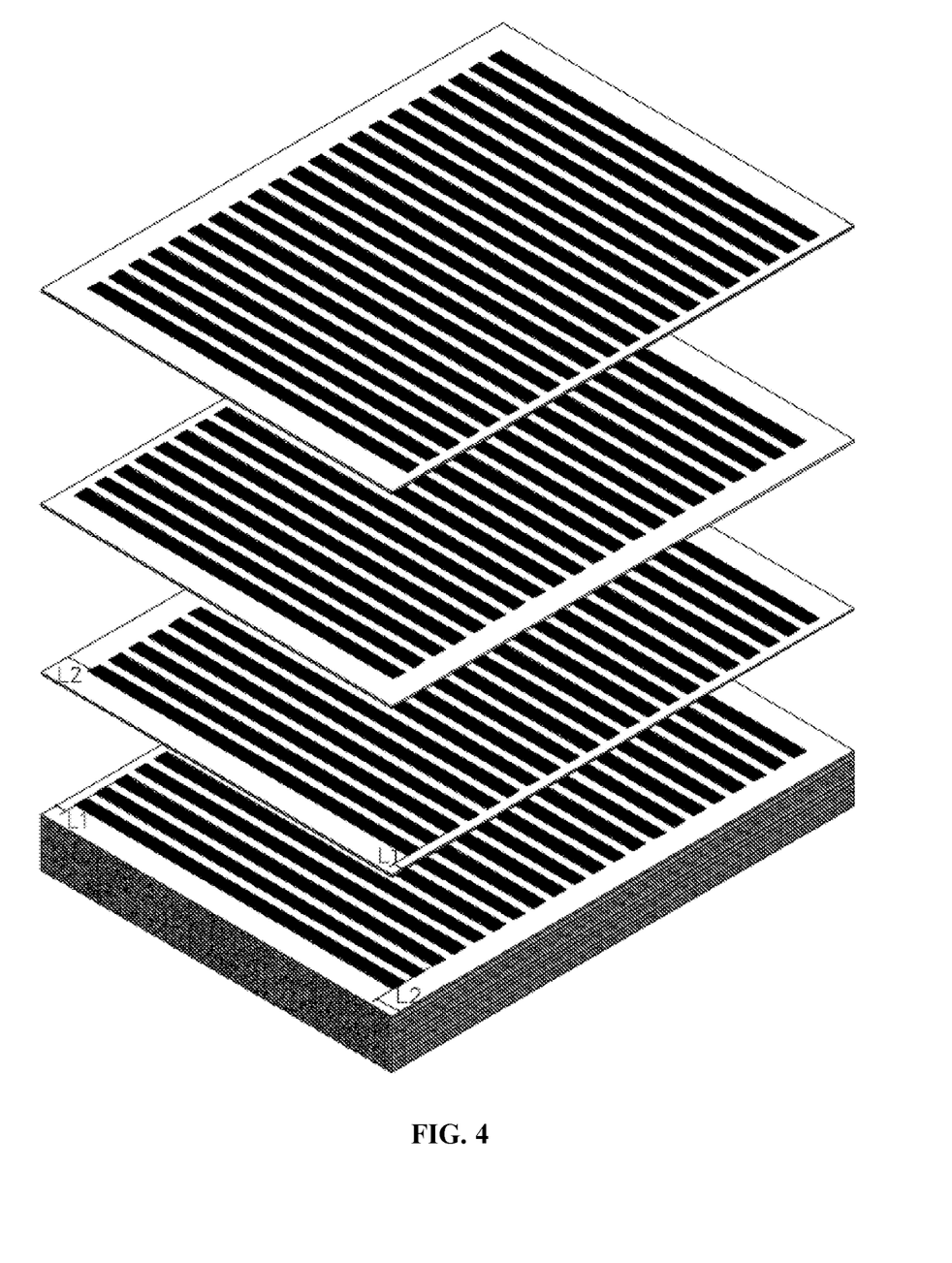
FIG. 4 is a diagram of stacked basic filtering plates in an embodiment of the present application.

As shown in FIG. 4, two adjacent layers are opposite in the horizontal direction when stacking. For example, an upper layer of strip-shaped conductive material has a larger recess distance (L2) on the left side and a smaller recess distance (L1) on the right side, while an adjacent layer has L1 on the left side and L2 on the right side.

In the present application, no matter which surface the electrode material is placed on, it is necessary to ensure that after stacking, some electrodes have a larger recess distance (L2) on the left side and a smaller recess distance (L1) on the right side, while it is opposite for the other electrodes, which can facilitate forming positive and negative electrodes inside the micro-electrostatic filter.

If the electrode material on one face is exposed to the outside after the basic filtering plates are stacked, to completely seal the electrode material, in the present embodiment, the exposed electrode material on one side is covered with at least one layer of electrode material isolating and carrying frame that is not provided with the electrode material, thereby completely sealing the electrode material in the insulating dielectric.

Step S5, heating a heating wire to a preset temperature, and hot-melt cutting a micro-electrostatic filter with a required size out of the filter mold base through relative movement of the filter mold base and the heating wire according to intervals of the strip-shaped conductive material, wherein each edge of the micro-electrostatic filter is subjected to hot-melt cutting, so as to form a micro-electrostatic filter with completely sealed electrodes.

Layers of basic filtering plates in traditional filters are not effectively pressed together, and gaps between the layers are apt to expose printed circuits, which leads to current leakage, arcing, and sparking; the layers are pasted together with glue, which may give rise to poor internal seal and exposure of the printed circuits under external influences such as heat, and ends with current leakage, arcing, and sparking.

The present application creatively adopts the manner of hot-melt cutting with a heating wire to cut individual micro-electrostatic filters one by one. During the hot-melt cutting with the heating wire, the insulating dielectric material at cut edges is hot melted and slightly liquefied to form curled edges, and after cooling, the cut edges between the layers blend with each other to seal the electrode material. The present application does not use glue to paste layers of basic filtering plates, overcomes the defects that the poor internal sealing and the exposure of the printed circuits as caused by the traditional processing manner are prone to problems such as current leakage, arcing, and sparking, and can realize completely enveloped and unbreakable dielectric material in the micro-electrostatic filter.

Figure 8:
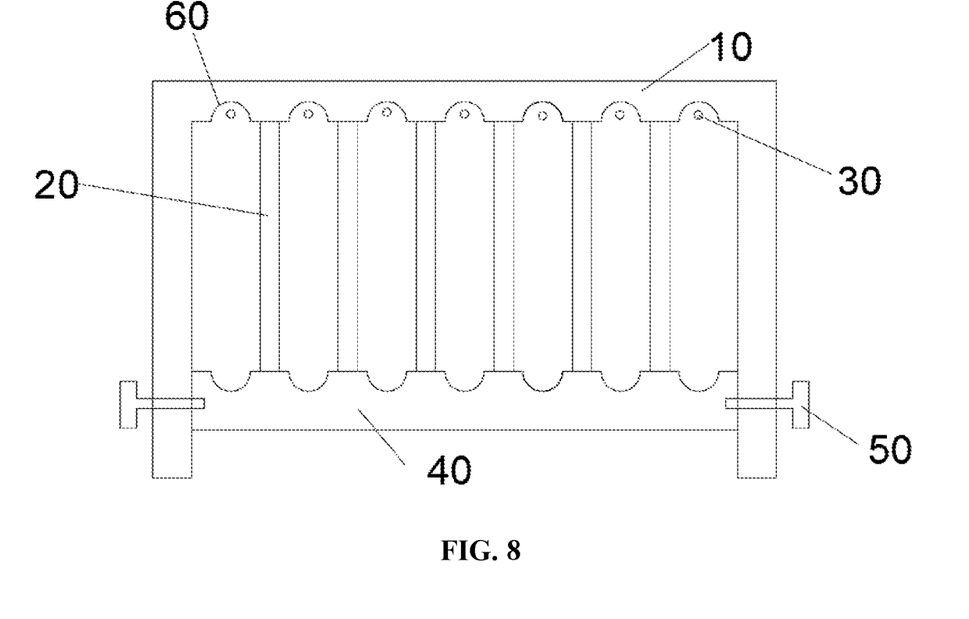
FIG. 8 is a structure diagram of a hot-melt cutting jig in an embodiment of the present application.

In a specific embodiment, said hot-melt cutting a micro-electrostatic filter with a required size comprises:
    stacking the basic filtering plates in a U-shaped body of a position-limiting device, placing pressure strips at intervals on a basic filtering plate that is on the top, and then mounting a front baffle plate on the U-shaped body through fasteners, so as to form a position limitation on the filter mold base;
    arranging grooves for movement of the heating wire on a front baffle plate and a rear baffle plate of the U-shaped body, and moving the heating wire along center lines of the grooves, so as to finish hot-melt cutting.

In the present embodiment, as shown in FIG. 8, the position-limiting device comprises a U-shaped body 10, pressure strips 20, a front baffle plate 40, and fasteners 50, and the U-shaped body comprises a left baffle plate, a right baffle plate, and a rear baffle plate. Grooves 60 are arranged at intervals on the front baffle plate and the rear baffle plate, and the interval between the center lines of the grooves 60 is determined according to the size of individual micro-electrostatic filters that need to be cut, and is consistent with the width of the individual micro-electrostatic filters.

The basic filtering plates are first stacked in the position-limiting device, then the pressure strips are pressed thereon, and each pressure strip is located between the two grooves. Subsequently, the front baffle plate is mounted, and the fasteners are screwed, so as to carry out the position limitation on the filter mold base.

The heating wire is located in each groove of the rear baffle plate before the cutting starts, and through relative movement, the heating wire gradually moves to the front baffle plate until it moves into the groove of the front baffle plate, so as to finish hot-melt cutting. The hot-melt cutting manner in the present embodiment can form cuts with high precision and small error.

In a specific embodiment, the strip-shaped conductive material on left and right sides of a single micro-electrostatic filter keeps a distance of 2 mm to 15 mm from edges, preferably 5 mm.

The strip-shaped conductive material on left and right sides keeps a certain distance from the edges of the micro-electrostatic filter, which can prevent the electrodes from sparking.

It should be noted that, in FIG. 8 as mentioned above, for hot-melt cutting upper and lower sides of the micro-electrostatic filter, corresponding grooves can also be arranged on the left baffle plate and the right baffle plate, and the heating wire can move horizontally to cut. For cutting the other sides of the micro-electrostatic filter, reference can be made to the above embodiment, and different position-limiting devices can be used to finish the cutting, which will not be elaborated herein.

Step S6, cutting electrode strip accommodating grooves, perpendicular to the strip-shaped conductive material, at two ends of the micro-electrostatic filter respectively in a length direction of the strip-shaped conductive material.

The positive and negative electrodes inside the micro-electrostatic filter are composed of printed strip-shaped conductive material. In the previous steps, two sheets of adjacent basic filtering plates are opposite in the horizontal direction when stacking. Since the strip-shaped conductive material on each layer of filtering basic plate has different recess distances at both ends, upon stacking in this way, at the two ends of the micro-electrostatic filter, some layers of strip-shaped conductive material are closer to the edges, while the other layers of strip-shaped conductive material are farther from the edges. In this case, an external power source can be connected by cutting grooves at two ends of the micro-electrostatic filter in a length direction of the strip-shaped conductive material respectively, and then placing electrode strips therein. The electrode strips placed therein are connected to the power source through insulated wires, and are electrically coupled with the strip-shaped conductive material inside the micro-electrostatic filter, so as to form positive and negative electrodes of the micro-electrostatic filter. A high-voltage electric field is generated by means of external connection with the power source, so as to remove dust.

Figure 5:
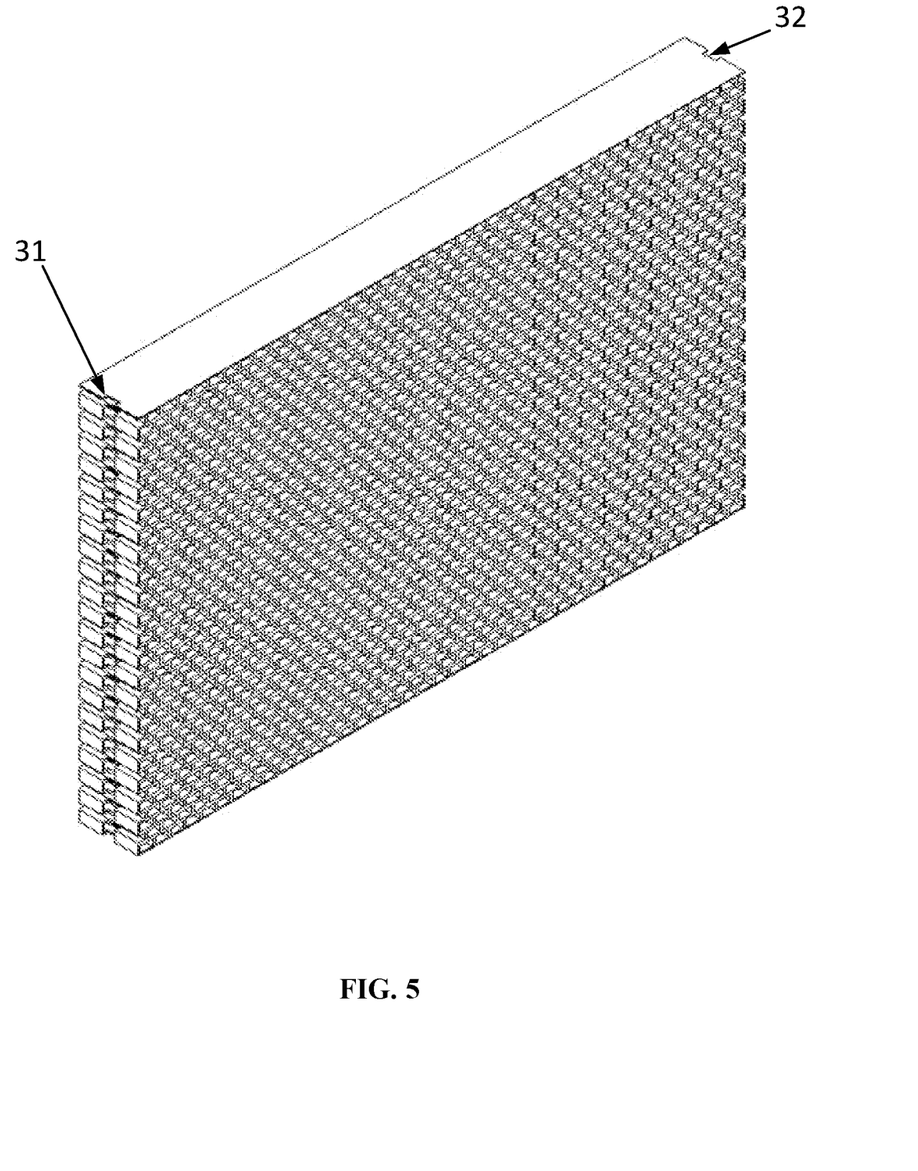
FIG. 5 is a diagram of a micro-electrostatic filter in an embodiment of the present application.
Figure 6:
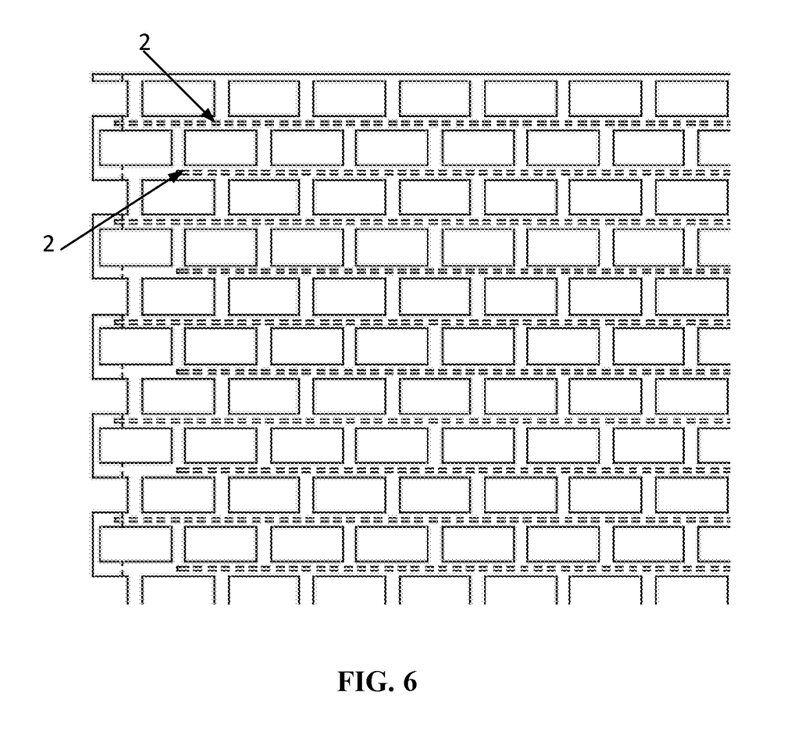
FIG. 6 is a partial enlarged diagram of a micro-electrostatic filter in an embodiment of the present application.

As shown in FIG. 5 and FIG. 6, electrode strip accommodating grooves 31 and 32 perpendicular to the plane where the strip-shaped conductive material is located are cut at two ends of the micro-electrostatic filter in a length direction of the strip-shaped conductive material, respectively. For example, FIG. 6 is a partial diagram of the upper left corner, where the strip-shaped conductive material on the upper layer has a shorter recess distance than the strip-shaped conductive material on the lower layer, i.e., the electrode strip accommodating groove cut on the strip-shaped conductive material on the upper layer is closer, thus the electrode strip accommodating groove 31 is coupled with the strip-shaped conductive material of this kind; whereas at the other end, it is opposite to the case in FIG. 6, and it is just coupled with the strip-shaped conductive material of the other kind.

In some embodiments, the electrode strip accommodating groove has a bottom portion that reaches the strip-shaped conductive material with a short recess distance at the end where it is, or continues to extend for 0 to 10 mm into the strip-shaped conductive material with a short recess distance at the end where it is, and the bottom portion of the electrode strip accommodating groove has a width of 2 mm to 10 mm. Electrode strip accommodating grooves are used for accommodating electrode strips, and the depth and width thereof are adapted to the electrode strips. After the electrode strips are placed in the accommodating grooves, the electrode strips are electrically coupled with the strip-shaped conductive material. The electrode strips are also connected with insulated wires respectively, and sealed in the electrode strip accommodating grooves with sealant, so that the electrode strips and joints connected with the insulated wires are all sealed in the electrode strip accommodating grooves, so as to achieve complete sealing.

In the other embodiments, electrode strip accommodation grooves 31 and 32 perpendicular to the plane where the strip-shaped conductive material is located are cut at two ends of the micro-electrostatic filter in a length direction of the strip-shaped conductive material, and the manner of hot-melt cutting is also adopted. In other words, the heating wire is heated to a preset temperature, and the electrode strip accommodating grooves, perpendicular to the strip-shaped conductive material, are cut through the relative movement of the micro-electrostatic filter and the heating wire at two ends of the micro-electrostatic filter in a length direction of the strip-shaped conductive material, respectively.

In the present embodiment, at the time of cutting, the electrode strip accommodating groove is cut in the manner of hot melt, at such a cutting depth that the bottom portion of the accommodating groove is just in contact with the electrode material with a short recess distance at the end where the accommodating groove is located, or extends for 0 to 10 mm into the accommodating groove at the end where the accommodating groove is located. In this way, among electrode materials with short distance. In this way, the electrode strips placed therein and the electrode material have good electric induction, and achieve a good electrification effect. Hot-melt cutting enables the electrode strips and conductive materials to have a better sealing performance.

Figure 7:
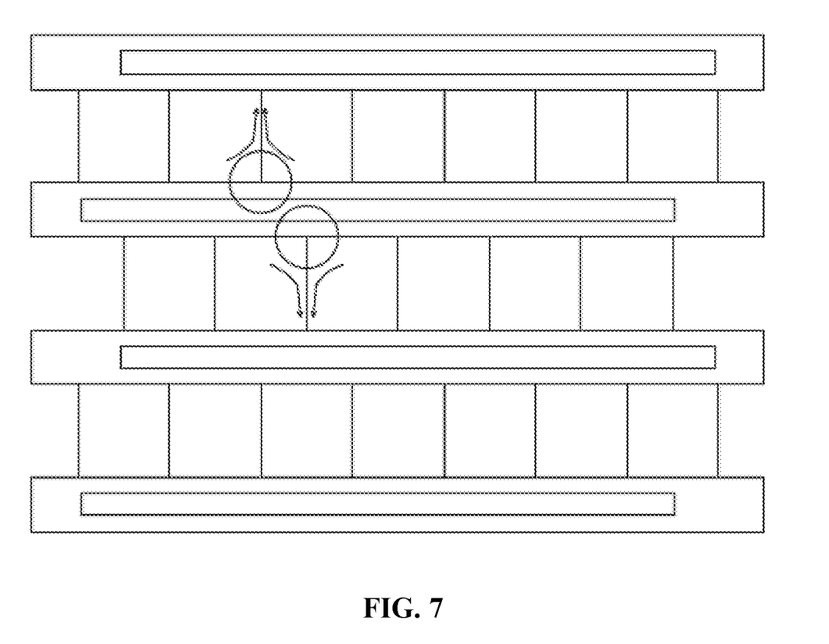
FIG. 7 is a diagram of partial dust collection of a micro-electrostatic filter in an embodiment of the present application.

As shown in FIG. 7, preferably, the air channel is quadrilateral; certainly, it can also be in other shapes, such as triangle and trapezoid. In a specific embodiment, quadrilateral air channels of adjacent basic filtering plates are in such alternate distribution that an interval-retaining spacer of a quadrilateral air channel of one sheet of basic filtering plate is located between two interval-retaining spacers of a quadrilateral air channel of another sheet of basic filtering plate. Designed in such a way that two circular areas alternate with each other as shown in FIG. 7, the quadrilateral air channels have corners that each are not prone to short circuit at the time of collecting dust, which can effectively avoid sparking in high-humidity environments. Each strip-shaped conductive material is parallel and equidistant, which avoids the problem of corona discharge caused by non-parallel electrodes.

In a specific embodiment, when the indoor temperature is 24° C. to 25° C., the heating wire has a heating temperature within a range from 190° C. to 210° C., preferably 200° C.

At the time of hot-melt cutting, an appropriate temperature can deform the heated dielectric material to a certain extent, slightly liquefy and curl the same, and completely envelop the electrodes without liquefied droplets, uneven appearance, or carbonization and discoloration of the appearance.

In a specific embodiment, the heating wire has an advance speed of 5 mm/min to 20 mm/min, preferably 12 mm/min.

In addition, an appropriate advance speed will ensure that the heating wire approaches but does not touch the filter to be cut in the process of the relative movement while it can finish cutting, which avoids the phenomenon that when the heating wire comes into contact with the filter to be cut, fluid hangs thereon. Once the phenomenon occurs, the temperature of the heating wire drops, which gives rise to a series of problems on defective products, such as overly high temperature adverse to hot-melt cutting, severe deformation of pores, and blackening of the material.

In the present embodiment, the relative movement between the heating wire and the micro-electrostatic filter to be cut is realized as a servo motor drives the heating wire or the micro-electrostatic filter to be cut, and the servo motor has a step frequency of 10 Hz to 40 Hz.

The above embodiments only express several implementation manners of the present application, which are described in a relatively specific and detailed way, but it should not be construed as limiting the scope of the patent for the invention. It should be noted that those skilled in the art can make several modifications and improvements without departing from the concept of the present application, and these all fall within the protection scope of the present application. Therefore, the protection scope of the patent application should be based on the claims as attached.

The invention claimed is:

1. A method for preparing an unbreakable micro-electrostatic filter, characterized by comprising:

drying granular insulating dielectric raw materials with a box dryer, and evenly mixing the dried granular insulating dielectric raw materials with a flame retardant and a color master batch to carry out secondary granulation;

using raw materials obtained by the secondary granulation, and after extrusion moulding, cutting to obtain an electrode material isolating and carrying frame, which comprises an upper panel and a lower panel, wherein an interval-retaining spacer is arranged between the upper panel and the lower panel, and the interval-retaining spacer, together with the upper panel and the lower panel, forms an air channel;

arranging a strip-shaped conductive material with a preset size on a surface of the electrode material isolating and carrying frame at regular interval, so as to obtain a basic filtering plate, wherein the strip-shaped conductive material on the basic filtering plate has two ends that are recessed at preset distances respectively, the preset distances are greater than zero, and a recess distance at one end is greater than that at the other end, wherein the recess distance is greater than 0 and smaller than 10 mm on one end, while the recess distance is 10 mm to 30 mm on the other end;

stacking basic filtering plates, horizontally rotating one of two adjacent basic filtering plates by 180° relative to the other when stacking, and after the stacking is completed, covering the strip-shaped conductive material exposed on one side with at least one layer of electrode material isolating and carrying frame that is not provided with an electrode material, so as to form a filter mold base;

heating a heating wire to a preset temperature, and hot-melt cutting a micro-electrostatic filter with a required size out of the filter mold base through relative movement of the filter mold base and the heating wire according to intervals of the strip-shaped conductive material, wherein each edge of the micro-electrostatic filter is subjected to hot-melt cutting, so as to form a micro-electrostatic filter with completely sealed electrodes;

heating the heating wire to a preset temperature, and cutting electrode strip accommodating grooves, perpendicular to the strip-shaped conductive material, through the relative movement of the micro-electrostatic filter and the heating wire at two ends of the micro-electrostatic filter in a length direction of the strip-shaped conductive material, respectively;

wherein the air channel is a quadrilateral air channel, and when the basic filtering plates are stacked, quadrilateral air channels of adjacent basic filtering plates are in such alternate distribution that an interval-retaining spacer of a quadrilateral air channel of one sheet of basic filtering plate is located between two interval-retaining spacers of a quadrilateral air channel of another sheet of basic filtering plate;

in said heating a heating wire to a preset temperature, the preset temperature is 190° ° C. to 210° C.;

the heating wire has an advance speed of 5 mm/min to 20 mm/min;

said hot-melt cutting a micro-electrostatic filter with a required size comprises:

stacking the basic filtering plates in a U-shaped body of a position-limiting device, wherein the position-limiting device comprises the U-shaped body, pressure strips, a front baffle plate, and fasteners, and the U-shaped body comprises a left baffle plate, a right baffle plate, and a rear baffle plate; placing pressure strips at intervals on a basic filtering plate that is on the top; and then mounting the front baffle plate on the U-shaped body through the fasteners, so as to form a position limitation on the filter mold base;

arranging grooves for movement of the heating wire on the front baffle plate and the rear baffle plate of the U-shaped body, and moving the heating wire along center lines of the grooves, so as to finish hot-melt cutting, wherein an interval between the center lines of the grooves is determined according to the size of individual micro-electrostatic filters that need to be cut, and is consistent with the width of the individual micro-electrostatic filters.

2. The method for preparing an unbreakable micro-electrostatic filter according to claim 1, characterized in that the granular insulating dielectric raw materials are at least one of polyethylene, polypropylene, polyvinyl chloride, polystyrene, acrylonitrile-butadiene-styrene copolymer, polyoxymethylene, polyamide, polycarbonate, polyethylene terephthalate, and polyimide;

the flame retardant is at least one of tris(2,3-dibromopropyl) isocyanurate, tribromophenol, tricresyl phosphate, triphenyl phosphinate, and dimethyl methylphosphonate;

the granular insulating dielectric raw materials have a weight percentage of 89% to 93%, the flame retardant has a weight percentage of 3% to 8%, and the color master batch has a weight percentage of 1% to 3%.

3. The method for preparing an unbreakable micro-electrostatic filter according to claim 1, characterized in that the strip-shaped conductive material has an internal resistance value within a range from $10^5$ megohms to $10^8$ megohms.

4. The method for preparing an unbreakable micro-electrostatic filter according to claim 1, characterized in that the strip-shaped conductive material of the micro-electrostatic filter on right and left sides keeps a distance of 2 mm to 15 mm from edges.

* * * * *